US012190866B2

(12) United States Patent
Roche

(10) Patent No.: US 12,190,866 B2
(45) Date of Patent: Jan. 7, 2025

(54) VOICE BASED MANUAL IMAGE REVIEW

(71) Applicant: Conduent Business Services, LLC, Florham Park, NJ (US)

(72) Inventor: Lee D Roche, Apex, NC (US)

(73) Assignee: Conduent Business Services, LLC, Florham Park, NJ (US)

( * ) Notice: Subject to any disclaimer, the term of this patent is extended or adjusted under 35 U.S.C. 154(b) by 326 days.

(21) Appl. No.: 17/707,029

(22) Filed: Mar. 29, 2022

(65) Prior Publication Data

US 2023/0317061 A1  Oct. 5, 2023

(51) Int. Cl.
   *G10L 15/08* (2006.01)
   *G06F 3/0481* (2022.01)
   *G10L 15/22* (2006.01)

(52) U.S. Cl.
   CPC ............ *G10L 15/08* (2013.01); *G06F 3/0481* (2013.01); *G10L 15/22* (2013.01); *G10L 2015/088* (2013.01); *G10L 2015/223* (2013.01)

(58) Field of Classification Search
   USPC .......................... 704/246, 247, 251, 252, 275
   See application file for complete search history.

(56) References Cited

U.S. PATENT DOCUMENTS

| | | | |
|---|---|---|---|
| 9,082,038 B2 | 7/2015 | Kozitsky et al. | |
| 9,501,707 B2 | 11/2016 | Bulan et al. | |
| 9,965,677 B2 | 5/2018 | Bulan et al. | |
| 10,026,004 B2 | 6/2018 | Mizes et al. | |
| 10,909,845 B2 | 2/2021 | Bernal et al. | |
| 10,929,661 B1* | 2/2021 | Manyam | G06V 40/172 |
| 11,093,487 B2 | 8/2021 | Erpenbach et al. | |

(Continued)

FOREIGN PATENT DOCUMENTS

EP    2 887 333 B1    8/2018

OTHER PUBLICATIONS

Satadal Saha, "A Review on Automatic License Plate Recognition System"; Students' Technical Article Competition: PRAYAS-2018, Apr. 29, 2018.

(Continued)

*Primary Examiner* — Leonard Saint-Cyr
(74) *Attorney, Agent, or Firm* — Ortiz & Lopez, PLLC; Kermit D. Lopez; Luis M. Ortiz

(57) ABSTRACT

Methods and systems for manual-based image review can involve associating an image with a group of keyword utterances, the image displayable in a display screen of a computing device, the group of keyword utterances including different keyword utterances. A prompt for the user to utter a keyword utterance can be displayed in a first area of the image in the display screen and another prompt for the user to utter another keyword utterance can be displayed in another area of the image in the display screen. Audio of the keyword utterances displayed in the display screen can be captured and processed by natural language processing (NLP), when uttered by the user. The utterances can be displayed respectively as text in the first area and the other area of the image in response to processing by NLP of the audio. Thus, instead of users typing in the results and changing their focus between screen and keyboard, for example, the user can speak to the results, which increases the throughput of the results.

17 Claims, 4 Drawing Sheets

(56) References Cited

U.S. PATENT DOCUMENTS

| | | | |
|---|---|---|---|
| 2005/0084134 A1* | 4/2005 | Toda | G08G 1/017 |
| | | | 382/105 |
| 2011/0202338 A1* | 8/2011 | Inghelbrecht | G10L 15/193 |
| | | | 704/E15.001 |
| 2017/0136631 A1* | 5/2017 | Li | B60L 53/126 |
| 2017/0262723 A1 | 9/2017 | Kozitsky et al. | |
| 2017/0358295 A1 | 12/2017 | Roux et al. | |
| 2018/0350229 A1* | 12/2018 | Yigit | G08G 1/0175 |
| 2019/0228276 A1* | 7/2019 | Lei | G06F 18/2163 |
| 2021/0097306 A1 | 4/2021 | Crary et al. | |
| 2021/0232762 A1 | 7/2021 | Munro et al. | |
| 2022/0375235 A1* | 11/2022 | Tatematsu | G06V 30/18162 |

OTHER PUBLICATIONS

Orhan Bulan, et al., "Segmentation- and Annotation-Free License Plate Recognition With Deep Localization and Failure Identification"; IEEE Transactions on Intelligent Transportation Systems. 2017.

Wikipedia, "Natural Language Processing", page last edited Jan. 30, 2022.

* cited by examiner

VOICE BASED MANUAL IMAGE REVIEW

TECHNICAL FIELD

Embodiments are related to the field of image-processing and video-based detection. Embodiments are also related to the field of license plate recognition including Automatic License Plate Recognition (ALPR) methods, devices, and systems. Embodiments further relate to the manual review of license plate images captured by ALPR devices and systems.

BACKGROUND

ALPR is a key enabler for several transportation applications. Though being a mature technology, a challenge with ALPR systems is scalability and minimizing human intervention in the existence of challenging noise sources present in license plate images captured under realistic conditions (i.e., field deployed solutions). These can include, for example, heavy shadows, non-uniform illumination, challenging optical geometries, partial occlusion, varying contrast, and general imaging noise. These challenging imaging conditions make it difficult to locate the license plate. Given these potential challenges, a number of captured license plate images cannot be recognized by a human, which in turn may lead to a waste of review effort and increased cost. Despite the use of automatic license plate image capture devices and software, it is still necessary to review the images and data captured and processed by ALPR systems.

ALPR systems can be employed in a variety of traffic surveillance applications, including toll monitoring, parking management, and detection of different types of traffic violation. FIG. 1 illustrates a high level block diagram providing an overview of operations and components of a prior art ALPR system 10. ALPR systems such as the example prior art system 10 shown in FIG. 1 typically include four stages. In the first stage, as shown at block 12, an image of a vehicle can be captured while the vehicle is moving (e.g., passing a toll booth). In this image acquisition stage, near infrared cameras are typically utilized to capture vehicle images both day and night time under low lighting conditions. In the second stage, as shown at block 14, the captured vehicle image is processed to localize the license plate region in the image. Many different methods may be implemented for license plate localization. After localizing the plate region in the image, the characters are segmented and extracted in the third stage, as shown at block 16. In the final stage, the segmented character images are recognized, as depicted at block 18, utilizing an OCR (Optical Character Recognition) engine trained in an offline phase. Thereafter, as shown at block 20, an operation can be implemented to identify a state associated with the license plate. The OCR engine typically outputs a confidence score for each of the segmented character from which an overall confidence score is calculated for the entire plate. If the overall confidence score is higher than a pre-defined threshold, recognized license plate number are transmitted directly to the rest of the processing pipeline without human interruption as indicated at block 22. When the confidence score is less than the threshold, the license plate image can go to a manual human review process to avoid the serious public relations problem of issuing improper citations.

FIG. 2 and FIG. 3 illustrate a conventional approach for a manual human review process for reviewing images processed by an ALPR system such as, for example, the ALPR system 10 depicted in FIG. 1. FIG. 2 illustrates a flow chart of operations depicting logical operational steps of a prior art manual review method 30. FIG. 3 illustrates a schematic diagram of a prior art user interface 48 used for manual review of images.

As shown at block 32, a step or operation can be implemented in which an image (e.g., a license plate image, image of a vehicle with a license plate, etc.) is displayed in the user interface 48, which is graphically displayed within a display area of a computer 50 (e.g., a desktop computer, a laptop computer, etc.). A user can look at the data displayed in the user interface 48, as shown at block 34. Note that this data may displayed in, for example, an image 52 as shown in the user interface 48 in FIG. 3, along with image ID location data time (e.g., plaza and lane), as shown in graphical area 54 displayed in the user interface 48.

Then, as indicated at decision block 36, a determination can be made as to whether or not a license plate has been found in the image. If no license plate is found in the image 42, then then an operation can be implemented to select the date on which no license has been found. The operation depicted at block 32 can then be repeated, and so on. When a license plate has been found in the image, as shown at decision block 36, a step or operation can be implemented in which the user can type in the license plate, as shown at block 40, and also type in the license plate state as indicated at block 42, and the license plate type, as depicted at block 44. The user may then move to the next image as shown at block 46.

The user interface 48 may display input areas in which the above information (i.e., license plate, state, vehicle type, etc.) can be input, as shown at graphical display areas 56, 58, 60 in FIG. 3. This information is directly related to the image 52 and data such as, for example, the data displayed in the graphical display area 54 of the user interface 48.

Based on the foregoing, it can be appreciated that current manual image review processes require users to look at an image and type the results into a display screen. This approach is inefficient due to user having to switch focus. This is also a sequential process and subject to additional potential errors.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved ALPR methods, systems, and devices.

It is another aspect of the embodiments to provide for an improved method of manual image review for ALPR technologies.

It is a further aspect of the embodiments to provide for methods and systems for increasing productivity of manual based image review.

The aforementioned aspects and other objectives and advantages can now be achieved as described herein.

In an embodiment, a method for manual-based image review, can involve: associating an image with a plurality of keyword utterances, the image displayable in a display screen of a computing device, the plurality of keyword utterances including different keyword utterances; displaying for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and capturing and processing by natural language processing (NLP), audio of the at least one keyword utterance and the at least one other keyword utterance when uttered by the user, for display of the at least one keyword utterance and the at least one other keyword utterance as text in the respective first area and the another area of the image, in response to processing by NLP of the audio.

In an embodiment, capturing and the processing by NLP of the at least one other keyword utterance can further involve: detecting the at least one other keyword utterance when uttered by the user.

In an embodiment, the NLP can be configured to "understand" the at least one keyword utterance and the at least one other keyword utterance uttered by the user posts NLP results to a back office after the processing of the audio.

In an embodiment, the image may be in an image of a vehicle.

In an embodiment, the plurality of keyword utterances associated with the image can include at least one of: a license plate number of the vehicle, a state of the vehicle, and a type of the vehicle.

In an embodiment, a system for manual-based image review, can include: a display screen for displaying an image associated with a plurality of keyword utterances, wherein the plurality of keyword utterances includes different keyword utterances; a user interface for displaying for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and an audio device for capturing and processing by natural language processing (NLP), audio of the at least one keyword utterance and the at least one other keyword utterance when uttered by the user, for display of the at least one keyword utterance and the at least one other keyword utterance as text in the respective first area and the another area of the image, in response to processing by NLP of the audio.

In an embodiment, a computer program product for facilitating manual-based image review of images, can include one or more computer readable storage media and program instructions collectively stored on the one or more computer readable storage media, the program instructions comprising program instructions to: associate an image with a plurality of keyword utterances, the image displayable in a display screen of a computing device, the plurality of keyword utterances including different keyword utterances; display for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and capture and process by natural language processing (NLP), audio of the at least one keyword utterance and the at least one other keyword utterance when uttered by the user, for display of the at least one keyword utterance and the at least one other keyword utterance as text in the respective first area and the another area of the image, in response to processing by NLP of the audio.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the embodiments.

DETAILED DESCRIPTION

Figure 1:
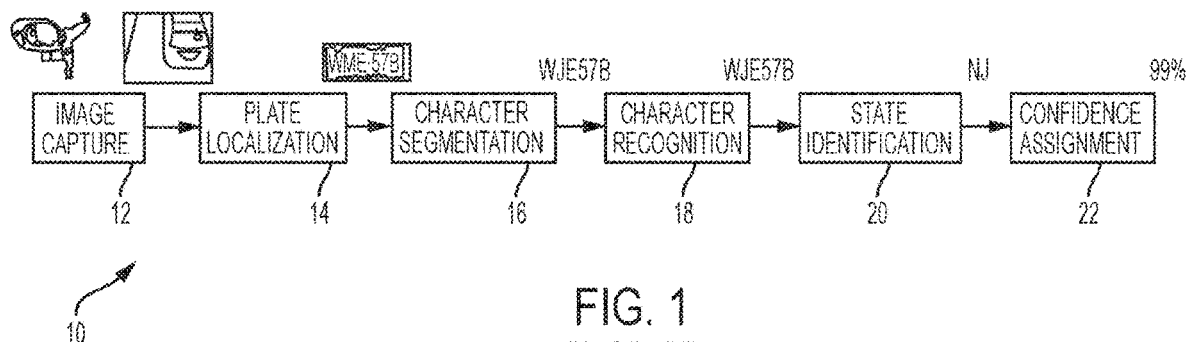
FIG. 1 illustrates a block diagram of a prior art ALPR (Automatic License Plate Recognition) system.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. In addition, terms or phrases such as "at least one" may refer to "one or more". For example, "at least one widget" may refer to "one or more widgets".

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

The term 'image' as utilized herein relates to a digital image, which is an image composed of picture elements; also known as pixels, each with finite, discrete quantities of numeric representation for its intensity or gray level that is an output from its two-dimensional functions fed as input by its spatial coordinates denoted with x; y on the x-axis and y-axis, respectively.

The term 'user interface' as utilized herein relates to the point of human-computer interaction and communication in a device. A user interface (UI) can include display screens, keyboards, a mouse and the appearance of a desktop. The UI is also the way through which a user can interact with an application or a website. An example of a UI is a graphical user interface (GUI).

As discussed previously, current manual image review processes used in the context of ALPR systems require users to look at an image and type the results (e.g., license plate number and state) in a display screen. This approach is inefficient due to the user have to switch focus. This is also a sequential process.

Instead of users typing in the results and changing their focus between screen and keyboard, the disclosed embodiments allow a user to speak to the results, which in turn can increase the throughput of results. By implementing the embodiments, a user can use a headset with his or her computing device (e.g., PC, tablet computer, smartphone, etc.) along with features such as, for example, Alexa, Siri, Google Home, and so on. The user thus sees the image. Each area in display screen can include a keyword utterance: State, Plate, Type etc. The utilized (Natural Language Processing) understands the utterances and posts the results to the back office. Thus, the users can say what they see and say "next" to move to the next image. The users no longer has to switch their focus.

Figure 4:
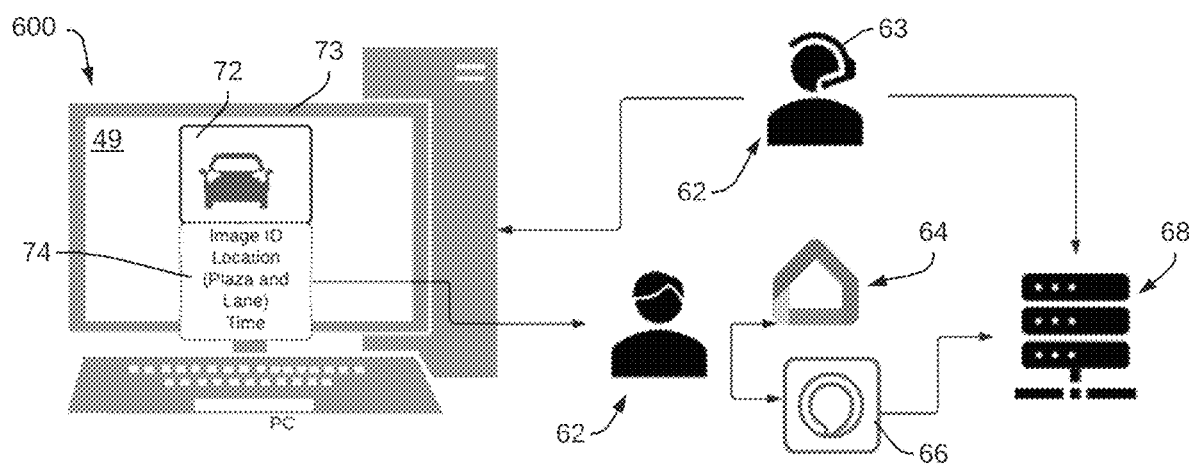
FIG. 4 illustrates a schematic diagram of a user interface that can be used to increase productivity of manual-based image review, in accordance with an embodiment.

FIG. 4 illustrates a schematic diagram of a user interface 49 that can be used to increase productivity of manual-based image review as part of a manual-based image review system 70, in accordance with an embodiment. The manual-based image review system 70 can be adapted for use with, for example, an ALPR system to increase productivity of the manual-review process of the ALPR system. The user interface 49 may be displayed in a display screen 73 (e.g., a monitor) of a computing system 600. The user interface 49 can display an image 72 of a vehicle along with pertinent data such as the image ID location and time (e.g., plaza and time) associated with the image 72.

Figure 2:
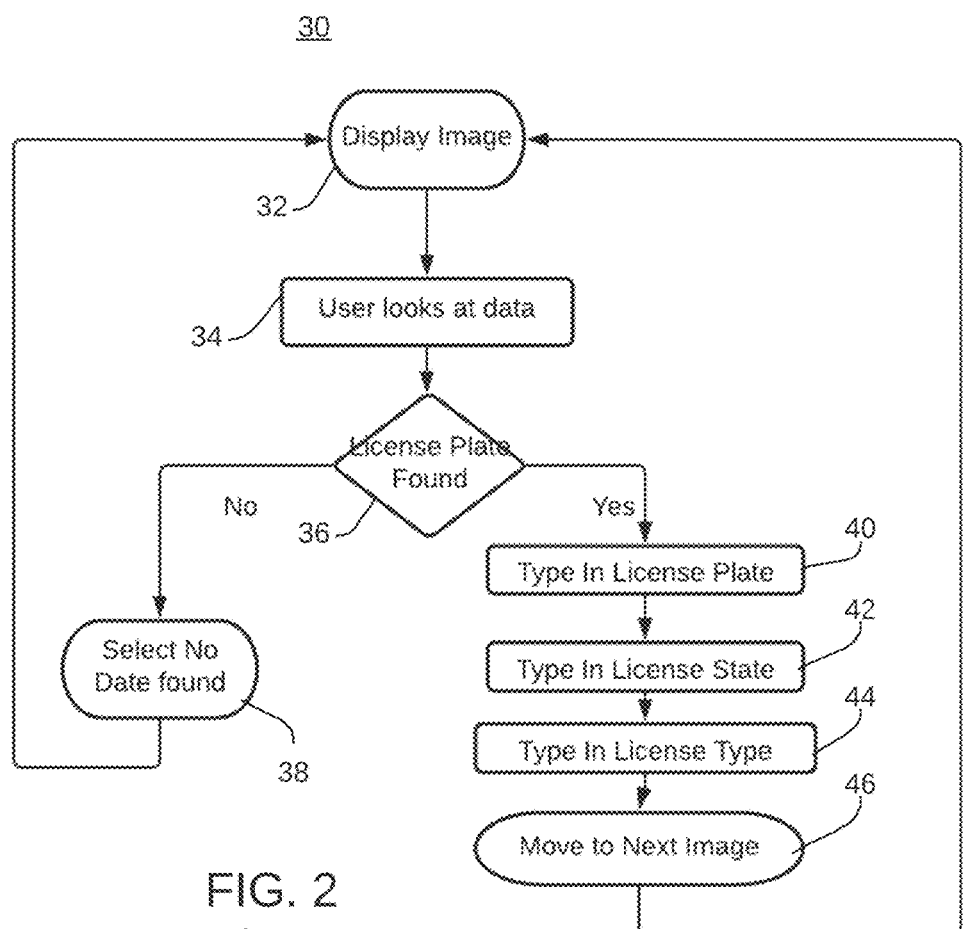
FIG. 2 illustrates a flow chart of operations depicting logical operational steps of a prior art manual review method.
Figure 3:
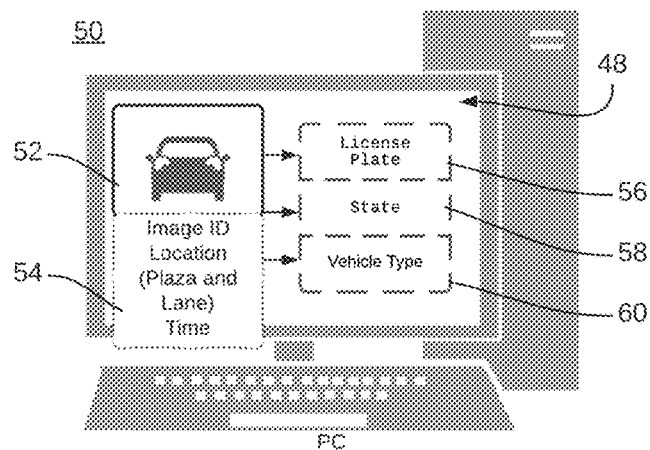
FIG. 3 illustrates a schematic diagram of a prior art user interface used for manual review of images.

The manual-based image review system 70 involves a user 62 who can review the image 72 displayed by the user interface 49. Instead of the user 62 typing in the results and changing their focus between the PC screen and keyboard (which is the case with the approach described herein with respect to FIG. 2 and FIG. 3), the user 62 can speak or utter the results to increase the throughput of the results. The user can use a headset 63 in communication with the computing system 600 to utter or speak the results for input to an audio device 64 such as, for example, an Alexa, Siri, Google Home, and so on. The audio device 64 can be configured to operate with, for example, an NLP. The uttered words can be processed by an NLP module 66 (e.g., Alex, Siri Google Home, and other NLP based software) and the results can be sent to a back office 68. Note that the term 'audio device' as used herein can relate to digital assistant software and hardware that can interpret human speech and respond via synthesized voices. Apple's Siri, Amazon's Alexa, Microsoft's Cortana, and Google's Assistant are currently the most popular digital assistants (also referred to as 'voice assistant's) and can be embedded in computing devices such as smartphones or dedicated home speakers.

Note that a non-limiting example of NLP that can be utilized to implement the NLP module 66 is disclosed in U.S. Patent Application Publication No. 20170358295 entitled "Natural Language Generation, A Hybrid Sequence-to-Sequence Approach," which published on Dec. 14, 2017 and is assigned to Conduent Business Services, LLC. U.S. Patent Application Publication No. 20170358295 is incorporated herein by reference in its entirety. Another non-limiting example of NLP, which may be utilized to implement the NLP module 66 is disclosed in U.S. Pat. No. 11,093,487, entitled "Natural language processing review and override based on confidence analysis," which issued on Aug. 17, 2021 to International Business Machines Corporation, and is incorporated herein by reference in its entirety. A further non-limiting example of NLP, which may be utilized to implement the NLP module 66 is disclosed in U.S. Patent Application Publication No. 20210232762, entitled "Architectures for Natural Language Processing," which published on Jul. 29, 2021 and is also assigned to International Business Machines Corporation. U.S. Patent Application Publication No. 20210232762 is incorporated herein by reference in its entirety.

Figure 5:
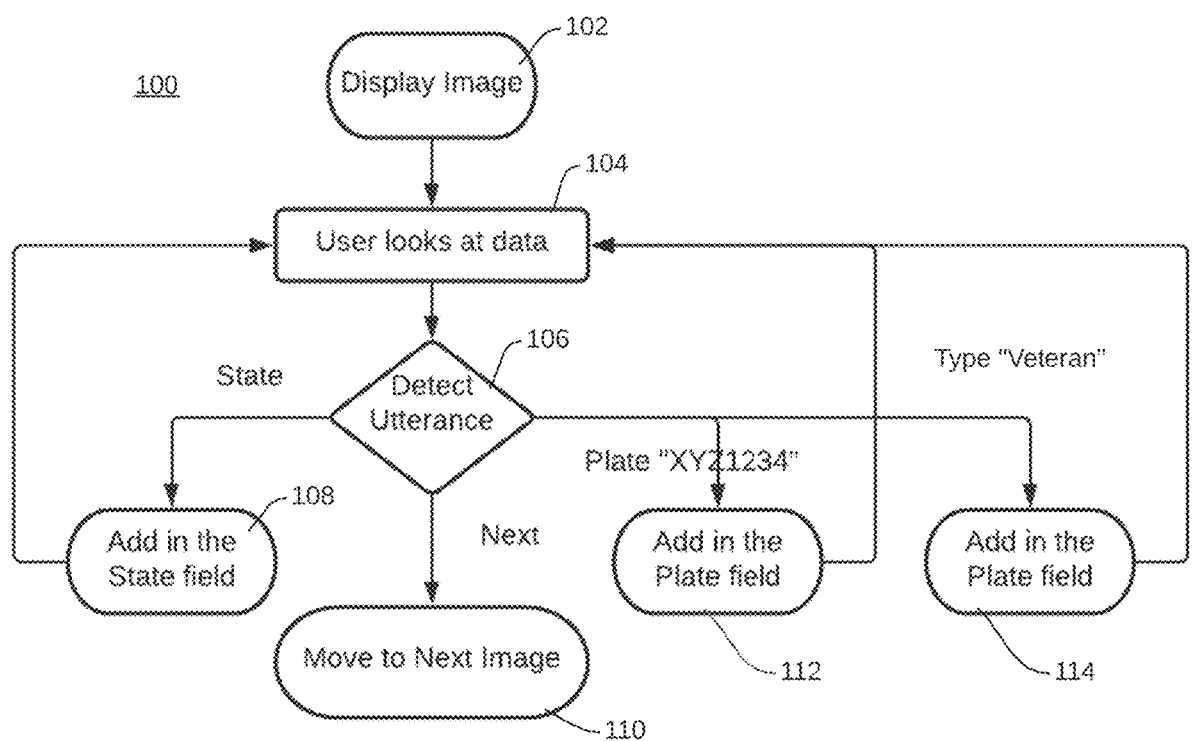
FIG. 5 illustrates a flow chart of operations depicting logical operational steps of a method for increasing productivity of manual-based image review, in accordance with an embodiment.

FIG. 5 illustrates a flow chart of operations depicting logical operational steps of a method 100 for increasing productivity of manual-based image review, in accordance with an embodiment. As shown at block 102, the image 72 can be displayed in the user interface 49 in the display screen 73. As depicted next at block 104, the user 62 can look at the data 74 associated with the image 72. The displayed data 74 may include a keyword utterance (e.g., State, Plate, Type, etc.). Examples of the displayed data include the data shown in, for example, the area 74 shown in FIG. 4.

Note that the term 'display screen' as utilized herein can relate to a surface area of a computing device (e.g., a personal computer (PC), smartphone, tablet computing device, laptop computer, and so on) upon which text, graphics and/or video can be temporarily made to appear for human viewing. The term 'display screen' can also relate to the user interface used with the computing device.

Next, as shown at decision block 106, a test can be performed to determine if the user 62 has spoken a keyword utterance (e.g., 'detect utterance' as shown in block 106). If, for example, the term "State" has been uttered by the user 62, then 'State' can be added automatically to a State field, as shown at block 108. Similarly, if the term "Plate" has been confirmed uttered by the user 62, then 'Plate' can be added automatically to the Plate field, as depicted at block 112. Likewise, if the term "Veteran" has been uttered by the user 62, then the word "Veteran" can be automatically added to the Plate field displayed in the display screen 73. Note that the term 'field' as utilized herein can relate to a location in a record in which a particular type of data may be stored. The term 'field' can also relate to a space in an on-screen form or area where a user can enter a specific item of information or in which the particular item of information may be automatically entered.

The NLP module 66 is operable to understand the utterances by the user 62 and then post the NLP results to the back office 68. The user 62 can just utter what they see on the display screen 73 and say the word "Next" to move to the next image, as depicted at block 110. The user 62 thus no longer has to switch his or her focus. The words spoken by the user 62 are thus processed by the NLP module 66.

Figure 6:
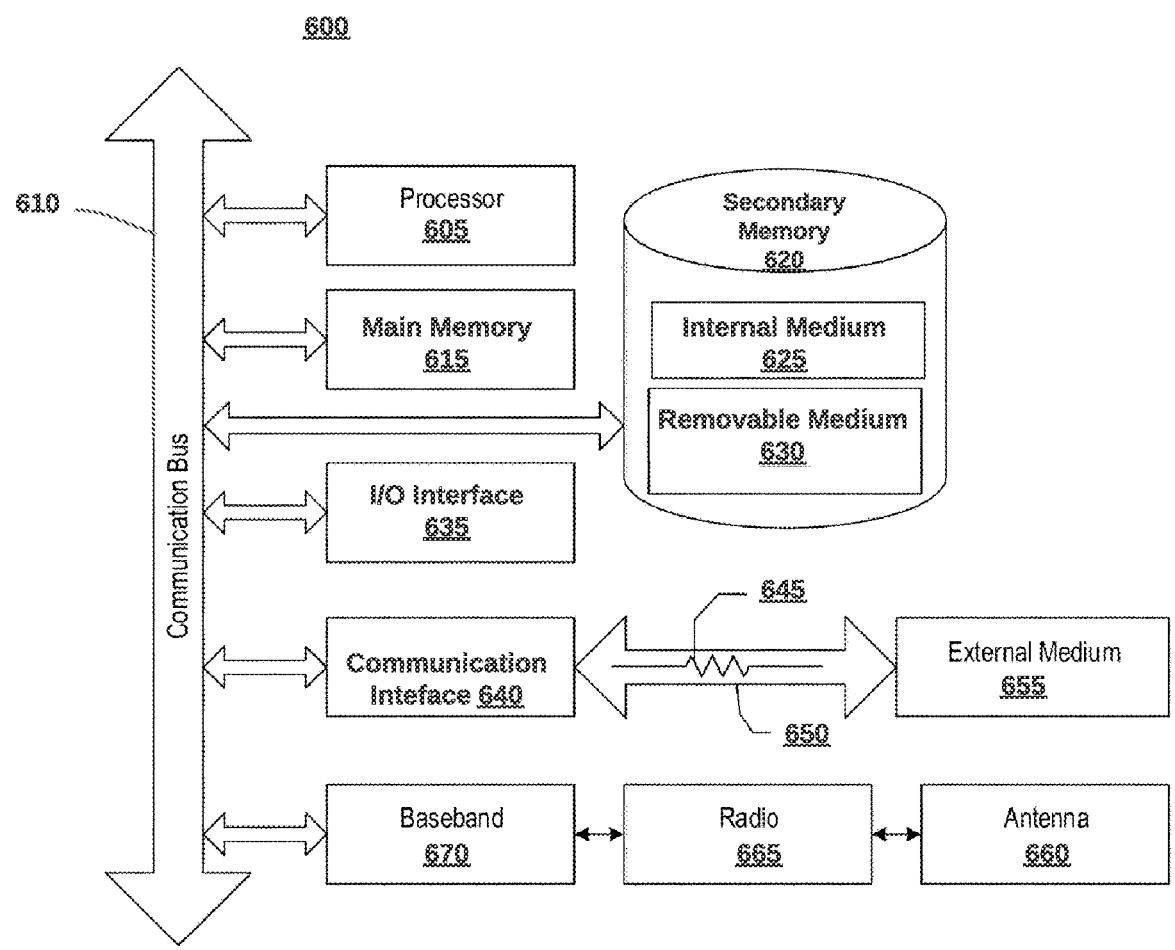
FIG. 6 illustrates a block diagram of a computing system can be adapted for use with an embodiment.

FIG. 6 illustrates a block diagram of a computing system 600 that can be adapted for use with an embodiment. Note that the term 'computing system' as utilized herein can also refer to a 'computer', a 'computing device' or a 'data-processing apparatus'. The computing system 600 can be implemented as a wired and/or wireless computer device suitable for use in one or more embodiments. The computing system 600 may be used to the implement manual-based image review system 70. The computing system 600 may be programmed with software comprising instructions that, when executed by at least one processor, cause the manual-based image review system 70 to perform the various steps, operations, functions, processes, and/or methods described herein, for example, as described in connection to, for example, FIG. 4 and FIG. 5. The computing system 600 shown in FIG. 6 can be used to implement, for example, the computing system/device 600 depicted in FIG. 4.

In various embodiments, the computing system 600 can be a personal computer, computer server, personal digital assistant, smart phone, tablet computer, or any other processor-enabled device that is capable of wired or wireless data communication. A server is an example of a type of computing system. Other computer systems and/or architectures may be also used, as will be clear to those skilled in the art. Note that the term 'computing system' as utilized herein can relate to a 'computing device' or 'computing apparatus'.

The computing system 600 preferably includes one or more processors, such as processor 605. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 605.

The processor 605 can be preferably connected to a communication bus 610. The communication bus 610 may include a data channel for facilitating information transfer between storage and other peripheral components of the computing system 600. The communication bus 610 further may provide a set of signals used for communication with the processor 605, including a data bus, address bus, and control bus (not shown). The communication bus 610 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

Computing system 600 preferably includes a main memory 615 and may also include a secondary memory 620. The main memory 615 provides storage of instructions and data for programs executing on the processor 605. For example, the main memory 615 may provide storage for modules or engines, a graphical user interface and so on, which may be representative of software modules or engine that, when executed by the processor 605, can perform the functions described in FIG. 4 and FIG. 5, and elsewhere herein.

The main memory 615 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 620 may optionally include an internal memory 625 and/or a removable storage medium 630, for example a floppy disk drive, a magnetic tape drive, a compact disc ("CD") drive, a digital versatile disc ("DVD") drive, etc. The removable storage medium 630 can be read from and/or written to in a well-known manner. Removable storage medium 630 may be, for example, a floppy disk, magnetic tape, CD, DVD, SD card, etc.

The removable storage medium 630 is a non-transitory computer readable medium having stored thereon computer executable code (i.e., software) and/or data. The computer software or data stored on the removable storage medium 630 is read into the computing system 600 for execution by the processor 605.

In some embodiments, the secondary memory 620 may include other similar means for allowing computer programs or other data or instructions to be loaded into the computing system 600. Such means may include, for example, an external storage medium 655 and a communication interface 640. Examples of external storage medium 655 may include an external hard disk drive or an external optical drive, or and external magneto-optical drive.

Other examples of secondary memory 620 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 630 and a communication interface, which allow software and data to be transferred from an external storage medium 655 to the computing system 600.

The Computing system 600 may also include an input/output ("I/O") interface 635. The I/O interface 635 facilitates input from and output to external devices. For example, the I/O interface 635 may receive input from a keyboard, mouse, touch screen, gestures detecting camera, speech command module, etc. and may provide output to a display generated by the graphical user interface (i.e., a type of 'user interface'). The I/O interface 635 is capable of facilitating input from and output to various alternative types of human interface and machine interface devices alike.

The computing system 600 may also include a communication interface 640. The communication interface 640 can allow software and data to be transferred between computing system 600 and external devices (e.g., printers), networks, or information sources. For example, computer software or executable code may be transferred to computing system 600 from a network server via communication interface 640. Examples of communication interface 640 include a modem, a network interface card ("NIC"), a wireless data card, a communications port, a PCMCIA slot and card, an infrared interface, and an IEEE 1394 fire-wire, just to name a few.

Communication interface 640 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 640 are generally in the form of the electrical communication signals 645. The electrical communication signals 645 are preferably provided to the communication interface 640 via a communication channel 650. In one embodiment, the communication channel 650 may be a wired or wireless network, or any variety of other communication links. The communication channel 650 can carry the electrical communication signals 645 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 615 and/or the secondary memory 620. Computer programs can also be received via the communication interface 640 and stored in the main memory 615 and/or the secondary memory 620. Such computer programs, when executed, enable the computing system 600 to perform the various functions of the embodiments as previously described.

In this description, the term "computer readable medium" can be used to refer to any non-transitory computer readable storage media used to provide computer executable code (e.g., software and computer programs) to the computing system 600. Examples of these media include the main memory 615, the secondary memory 620 (including the internal memory 625, the removable storage medium 630, and the external storage medium 655), and any peripheral device communicatively coupled with the communication interface 640 (including a network information server or other network device). These non-transitory computer readable mediums are means for providing executable code, programming instructions, and software to the computing system 600.

In an embodiment implemented using software, the software may be stored on a computer readable medium and loaded into the computing system 600 by way of removable storage medium 630, I/O interface 635, or communication interface 640. In such an embodiment, the software is loaded into the computing system 600 in the form of electrical communication signals 645. The software, when executed by the processor 605, preferably causes the processor 605 to perform the inventive features and functions previously described herein.

The computing system 600 can also include optional wireless communication components that facilitate wireless communication over a voice and over a data network. The wireless communication components can comprise an antenna system 660, a radio system 665 and a baseband system 670. In the computing system 600, radio frequency ("RF") signals are transmitted and received over the air by the antenna system 660 under the management of the radio system 665.

In one embodiment, the antenna system 660 may comprise one or more antennae and one or more multiplexors (not shown) that perform a switching function to provide the antenna system 660 with transmit and receive signal paths. In the receive path, received RF signals can be coupled from a multiplexor to a low noise amplifier (not shown) that amplifies the received RF signal and sends the amplified signal to the radio system 665.

In alternative embodiments, the radio system 665 may comprise one or more radios that can be configured to communicate over various frequencies. In one embodiment, for example, the radio system 665 may combine a demodulator (not shown) and modulator (not shown) in one integrated circuit ("IC"). The demodulator and modulator can also be separate components. In the incoming path, the demodulator strips away the RF carrier signal leaving a baseband received audio signal, which is sent from the radio system 665 to the baseband system 670.

If the received signal contains audio information, then baseband system 670 decodes the signal and converts it to an analog signal. Then the signal is amplified and sent to a speaker. The baseband system 670 also receives analog audio signals from a microphone. These analog audio signals can be converted to digital signals and encoded by the baseband system 670. The baseband system 670 can also code the digital signals for transmission and generates a baseband transmit audio signal that is routed to the modulator portion of the radio system 665. The modulator can mix the baseband transmit audio signal with an RF carrier signal generating an RF transmit signal that is routed to the antenna system and may pass through a power amplifier (not shown). The power amplifier can amplify the RF transmit signal and can route it to the antenna system 660 where the signal can be switched to the antenna port for transmission.

The baseband system 670 is also communicatively coupled with the processor 605. The processor 605 has access to one or more data storage areas including, for example, but not limited to, the main memory 615 and the secondary memory 620. The processor 605 is preferably configured to execute instructions (i.e., computer programs or software) that can be stored in the main memory 615 or in the secondary memory 620. Computer programs can also be received from the baseband system 670 and stored in the main memory 615 or in the secondary memory 620 or executed upon receipt. Such computer programs, when executed, enable the computing system 600 to perform the various functions of the embodiments. For example, the main memory 615 may include various software modules (not shown) that can be executable by processor 605.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor.

By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations.

As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Furthermore, the functionalities including operations, steps and instructions described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon. The term "engine" in particular can relate to a "software engine".

Although not required, the disclosed embodiments can be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, modules implemented as program modules may include, but are not limited to, routines, subroutines, software applications, programs, objects, components, data structures, etc., that can perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module), and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that can be a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a system such as, for example, the manual-based image review system 70 described herein. That is, as discussed previously, the embodiments can increase the productivity of manual-based image review for ALPR systems. An example 'module' may include steps, operations, or instructions such as those illustrated and described herein with respect to blocks 102, 104, 106, 108, 110, 112, and 114.

Based on the foregoing, it can be appreciated that a number of varying embodiments are disclosed herein. For example, in an embodiment, a method of manual-based image review can involve: associating an image with a plurality of keyword utterances, the image displayable in a display screen of a computing device, the plurality of keyword utterances including different keyword utterances; displaying for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and capturing and processing by NLP, audio of the at least one keyword utterance and the at least one other keyword utterance when uttered by the user, for display of the at least one keyword utterance and the at least one other keyword utterance as text in the respective first area and the another area of the image, in response to processing by NLP of the audio.

In an embodiment, the step or operation of capturing and the processing by NLP of the at least one other keyword utterance further comprises, can further involve detecting the at least one other keyword utterance when uttered by the user.

In an embodiment, NLP can be operable to "understand" the at least one keyword utterance and the at least one other keyword utterance uttered by the user posts NLP results to a back office after the processing of the audio.

In an embodiment, the plurality of keyword utterances associated with the image can include one or more of, for example, a license plate number of the vehicle, a state of the vehicle, a type of the vehicle, and other features or indicators.

In another embodiment, a system for manual-based image review, can include: a display screen for displaying an image associated with a plurality of keyword utterances, wherein the plurality of keyword utterances includes different keyword utterances; a user interface for displaying for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and an audio device for capturing and processing by NLP, audio of the at least one keyword utterance and the at least one other keyword utterance when uttered by the user, for display of the at least one keyword utterance and the at least one other keyword utterance as text in the respective first area and the another area of the image, in response to processing by NLP of the audio.

In yet another embodiment, a computer program product can be implemented for facilitating manual-based image review of images, the computer program product comprising one or more computer readable storage media and program instructions collectively stored on the one or more computer readable storage media. The program instructions can include program instructions to: associate an image with a plurality of keyword utterances, the image displayable in a display screen of a computing device, the plurality of keyword utterances including different keyword utterances; display for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and capture and process by NLP, audio of the at least one keyword utterance and the at least one other keyword utterance when uttered by the user, for display of the at least one keyword utterance and the at least one other keyword utterance as text in the respective first area and the another area of the image, in response to processing by NLP of the audio.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for manual-based image review, comprising:
    associating an image with a plurality of keyword utterances, the image displayable in a display screen of a computing device, the plurality of keyword utterances including different keyword utterances, wherein each area of the display screen displays at least one keyword utterance among the plurality of keyword utterances;
    displaying for a user, a prompt for the user to utter the at least one keyword utterance among the plurality of keyword utterances in a first area of the image displayed in the display screen and another prompt for the user to utter at least one other keyword utterance among the plurality of keyword utterances in another area of the image displayed in the display screen;
    capturing and processing by natural language processing (NLP), audio of the at least one keyword utterance and the at least one other keyword utterance when uttered by the user through an audio device operable to operate with the NLP, for display of the at least one keyword utterance and the at least one other keyword utterance as text in the respective first area and the another area of the image, in response to processing by NLP of the audio, wherein the NLP is operable to understand the at least one keyword utterance and post NLP results resulting from the capturing and the processing by the NLP;
    wherein the NLP understands the at least one keyword utterance and the at least one other keyword utterance uttered by the user posts NLP results to a back office after the processing of the audio; and
    the NLP comprises at least one of: NLP based on a hybrid sequence-to-sequence approach, and NLP processing review and override based on confidence analysis.

2. The method of claim 1 wherein the capturing and the processing by NLP of the at least one other keyword utterance further comprises: detecting the at least one other keyword utterance when uttered by the user.

3. The method of claim 1 wherein:
    the capturing and the processing by NLP of the at least one other keyword utterance further comprises: detecting the at least one other keyword utterance when uttered by the user; and
    the NLP understands the at least one keyword utterance and the at least one other keyword utterance uttered by the user posts NLP results to a back office after the processing of the audio.

4. The method of claim 1 wherein the image comprises an image of a vehicle.

5. The method of claim 4 wherein the plurality of keyword utterances associated with the image includes at least one of: a license plate number of the vehicle, a state of the vehicle, and a type of the vehicle.

6. The method of claim 1 wherein the image comprises an image of a vehicle and wherein the plurality of keyword utterances associated with the image includes at least one of: a license plate number of the vehicle, a state of the vehicle, and a type of the vehicle.

7. The method of claim 1 wherein the image comprises an image of a vehicle and wherein the plurality of keyword utterances associated with the image includes a license plate number of the vehicle, a state of the vehicle, and a type of the vehicle.

8. A system for manual-based image review, comprising:
    a display screen for displaying an image associated with a plurality of keyword utterances, wherein the plurality of keyword utterances includes different keyword utterances;
    a user interface for displaying for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and
    an audio device for capturing and processing by natural language processing (NLP), audio of the at least one keyword utterance and the at least one other keyword utterance when uttered by the user through an audio device operable to operate with the NLP, for display of the at least one keyword utterance and the at least one other keyword utterance as text in the respective first area and the another area of the image, in response to processing by NLP of the audio, wherein the NLP is operable to understand the at least one keyword utterance and post NLP results resulting from the capturing and the processing by the NLP;
    wherein the NLP understands the at least one keyword utterance and the at least one other keyword utterance uttered by the user posts NLP results to a back office after the processing of the audio; and
    the NLP comprises at least one of: NLP based on a hybrid sequence-to-sequence approach, and NLP processing review and override based on confidence analysis.

9. The system of claim 8 wherein the capturing and the processing by NLP of the at least one other keyword utterance involves detecting the at least one other keyword utterance when uttered by the user.

10. The system of claim 8 wherein:
the capturing and the processing by NLP of the at least one other keyword utterance further comprises: detecting the at least one other keyword utterance when uttered by the user; and
the NLP understands the at least one keyword utterance and the at least one other keyword utterance uttered by the user posts NLP results to a back office after the processing of the audio.

11. The system of claim 8 wherein the image comprises an image of a vehicle.

12. The system of claim 11 wherein the plurality of keyword utterances associated with the image includes at least one of: a license plate number of the vehicle, a state of the vehicle, and a type of the vehicle.

13. The system of claim 11 wherein the image comprises an image of a vehicle and wherein the plurality of keyword utterances associated with the image includes at least one of: a license plate number of the vehicle, a state of the vehicle, and a type of the vehicle.

14. The system of claim 11 wherein the image comprises an image of a vehicle and wherein the plurality of keyword utterances associated with the image includes a license plate number of the vehicle, a state of the vehicle, and a type of the vehicle.

15. A computer program product for facilitating manual-based image review of images, the computer program product comprising one or more non-transitory computer readable storage media and program instructions collectively stored on the one or more non-transitory computer readable storage media, the program instructions comprising program instructions to:
associate an image with a plurality of keyword utterances, the image displayable in a display screen of a computing device, the plurality of keyword utterances including different keyword utterances;
display for a user, a prompt for the user to utter at least one keyword utterance among the plurality of keyword utterances in a first area of the image displayed in the display screen and another prompt for the user to utter at least one other keyword utterance among the plurality of keyword utterances in another area of the image displayed in the display screen; and
capture and process by natural language processing (NLP), audio of the at least one keyword utterance and the at least one other keyword utterance when uttered by the user through an audio device operable to operate with the NLP, for display of the at least one keyword utterance and the at least one other keyword utterance as text in the respective first area and the another area of the image, in response to processing by NLP of the audio, wherein the NLP is operable to understand the at least one keyword utterance and post NLP results resulting from the capturing and the processing by the NLP;
wherein the NLP understands the at least one keyword utterance and the at least one other keyword utterance uttered by the user posts NLP results to a back office after the processing of the audio; and
the NLP comprises at least one of: NLP based on a hybrid sequence-to-sequence approach, and NLP processing review and override based on confidence analysis.

16. The computer program product of claim 15 wherein the program instructions further comprise program instructions to detect the at least one other keyword utterance when uttered by the user.

17. The computer program product of claim 15 wherein:
the image comprises an image of a vehicle; and
the plurality of keyword utterances associated with the image includes at least one of: a license plate number of the vehicle, a state of the vehicle, and a type of the vehicle.

* * * * *